(12) United States Patent
Hammoud

(10) Patent No.: US 8,959,423 B2
(45) Date of Patent: Feb. 17, 2015

(54) DRILL-THROUGH LENS FOR GENERATING DIFFERENT TYPES OF REPORTS

(75) Inventor: Amer Hammoud, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 13/171,188

(22) Filed: Jun. 28, 2011

(65) Prior Publication Data

US 2013/0007577 A1    Jan. 3, 2013

(51) Int. Cl.
| | | |
|---|---|---|
| G06F 17/00 | (2006.01) |
| G06F 17/18 | (2006.01) |
| G06F 17/27 | (2006.01) |
| G06F 17/30 | (2006.01) |
| G06F 3/0481 | (2013.01) |

(52) U.S. Cl.
CPC .......... *G06F 3/0481* (2013.01); *G06F 3/04812* (2013.01)
USPC ............................ 715/205; 715/212; 715/215

(58) Field of Classification Search
CPC .................... G06Q 10/06375; G06Q 30/0201; G06Q 40/06; G06Q 40/12; G06F 17/00; G06F 17/21; G06F 17/30905; G06F 3/048; G06F 17/30; G06F 17/30861; G06F 17/30011; G06F 17/30994; G06F 17/30554; G06F 17/30716; G06F 17/30277; G06F 17/30253
USPC ....................................................... 715/205
See application file for complete search history.

(56) References Cited

U.S. PATENT DOCUMENTS

| | | |
|---|---|---|
| 5,844,572 A | 12/1998 | Schott |
| 6,496,832 B2 | 12/2002 | Chi et al. |
| 6,988,241 B1 | 1/2006 | Guttman et al. |
| 7,640,496 B1 | 12/2009 | Chaulk et al. |
| 7,698,287 B2 | 4/2010 | Becker et al. |
| 7,802,182 B2* | 9/2010 | Bales ............................ 715/235 |
| 7,873,526 B2 | 1/2011 | Iwasa et al. |
| 7,877,465 B2 | 1/2011 | Kontamsetty et al. |
| 2001/0017622 A1 | 8/2001 | Patel et al. |
| 2003/0188258 A1 | 10/2003 | Aureglia et al. |
| 2006/0061597 A1* | 3/2006 | Hui ............................... 345/629 |
| 2006/0167757 A1 | 7/2006 | Holden et al. |
| 2007/0220416 A1 | 9/2007 | Mitsui |

(Continued)

OTHER PUBLICATIONS

Entitled "Comparative and Analytic Lens", filed on Jun. 28, 2011, invented by A. Hammoud, 39 pp.

(Continued)

*Primary Examiner* — Adam M Queler
*Assistant Examiner* — Ariel Mercado
(74) *Attorney, Agent, or Firm* — Janaki K. Davda; Konrad, Raynes, Davda and Victor LLP

(57) ABSTRACT

Provided are techniques for providing drill-through information. User input of locations of one or more target documents and values of parameters for those one or more target documents is received. A user is allowed to move a drill-through lens window across a source document, wherein the drill-through lens window displays a floating, transparent target document. In response to the drill-through lens window floating over the data in the source document, in real time: the data is selected in the source document, the selected data is identified as a parameter for a target document, the parameter is used to obtain further details from the target document, and the drill-through lens window is displayed showing the further details.

18 Claims, 12 Drawing Sheets

(56) References Cited

U.S. PATENT DOCUMENTS

| | | | |
|---|---|---|---|
| 2008/0010605 A1* | 1/2008 | Frank | 715/765 |
| 2008/0115076 A1* | 5/2008 | Frank et al. | 715/771 |
| 2009/0063960 A1 | 3/2009 | Anwar | |
| 2009/0070744 A1* | 3/2009 | Taylor et al. | 717/128 |
| 2009/0327851 A1 | 12/2009 | Raposo | |
| 2010/0034442 A1 | 2/2010 | Minakuchi et al. | |
| 2010/0107062 A1* | 4/2010 | Bacus et al. | 715/269 |
| 2010/0174678 A1 | 7/2010 | Massand | |
| 2011/0209048 A1 | 8/2011 | Scott et al. | |
| 2012/0084644 A1* | 4/2012 | Robert et al. | 715/255 |

OTHER PUBLICATIONS

Wikipedia, "Spreadsheet", [online], Last Modified on Jun. 7, 2011, [Retrieved on Jun. 8, 2011], retrieved from the Internet at <URL: http://en.wikipedia.org/wiki/Spreadsheet>, 23 pp.

"Hover Preview Card", [online], [retrieved on Jun. 14, 2011], updated on May 17, 2011. Retrieved from the Internet at <URL: http://dleadt.torolab.ibm.com/uxd/getMLpage.jsp?ml=101189>, Total 6 pp.

Office Action 1, Dec. 3, 2012, for U.S. Appl. No. 13/171,156, filed Jun. 28, 2011 by A. Hammoud, Total 24 pp.

Amendment 1, Mar. 1, 2013, for U.S. Appl. No. 13/171,156, filed Jun. 28, 2011 by A. Hammoud, Total 14 pp.

Final Office Action, dated Jun. 5, 2013, for U.S. Appl. No. 13/171,156, filed Jun. 28, 2011, entitled, "Comparative and Analytic Lens", invented by A. Hammoud et al., pp. 1-28.

Response to Final Office Action, dated Sep. 3, 2013, for U.S. Appl. No. 13/171,156, filed Jun. 28, 2011, entitled, "Comparative and Analytic Lens", invented by A. Hammoud et al., pp. 1-13.

Notice of Allowance, dated Oct. 6, 2014, for U.S. Appl. No. 13/171,156, filed Jun. 28, 2011 by inventor A. Hammoud et al., Total 19 pages.

* cited by examiner

FIG. 4

| Product Line | Product Type | Quantity |
|---|---|---|
| Camping Equipment | Cooking Gear | 198676 |
| Camping Equipment | Tents | 130664 |
| Camping Equipment | Sleeping Bags | |
| Camping Equipment | Packs | |
| Camping Equipment | Lanterns | |
| Mountaineering Equipment | Rope | |
| Mountaineering Equipment | Safety | |
| Mountaineering Equipment | Climbing Accessories | |
| Mountaineering Equipment | Tools | |
| Personal Accessories | Watches | 53510 |
| Personal Accessories | Eyewear | 134134 |
| Personal Accessories | Knives | 43330 |
| Personal Accessories | Binoculars | 56666 |
| Personal Accessories | Navigation | 270074 |
| Outdoor Protection | Insect Repellents | 215432 |
| Outdoor Protection | Sunscreen | 72348 |
| Outdoor Protection | First Aid | 14244 |
| Golf Equipment | Irons | 13924 |
| Golf Equipment | Woods | 23244 |
| Golf Equipment | Putters | |

FIG. 6

| Product Line | Product Type | Quantity |
|---|---|---|
| Camping Equipment | Cooking Gear | 198676 |
| Camping Equipment | Tents | 130664 |
| Camping Equipment | Sleeping Bags | 5246 |
| Camping Equipment | Packs | 5552 |
| Camping Equipment | Lanterns | 5096 |
| Mountaineering Equipment | Rope | 0678 |
| Mountaineering Equipment | Safety | |
| Mountaineering Equipment | Climbing Accessories | |
| Mountaineering Equipment | Tools | |
| Personal Accessories | Watches | 134134 |
| Personal Accessories | Eyewear | |
| Personal Accessories | Knives | 43330 |
| Personal Accessories | Binoculars | 56666 |
| Personal Accessories | Navigation | |
| Outdoor Protection | Insect Repellents | 270074 |
| Outdoor Protection | Sunscreen | 215432 |
| Outdoor Protection | First Aid | 72348 |
| Golf Equipment | Irons | 14244 |
| Golf Equipment | Woods | 13924 |
| Golf Equipment | Putters | 23244 |

Product
☐ Hibernator Lite
☐ Hibernator Extreme
☐ Hibernator Self-Inflating
☐ Hibernator Pad
☐ Hibernator Pillow
☐ Hibernator Camp Cot Products By Qty

FIG. 9

| Product Line | Product Type | | |
|---|---|---|---|
| Camping Equipment | Cooking Gear | | |
| Camping Equipment | Tents | | |
| Camping Equipment | Sleeping Bags | | |
| Camping Equipment | Packs | | |
| Camping Equipment | Lanterns | | |
| Mountaineering Equipment | Rope | | |
| Mountaineering Equipment | Safety | | |
| Mountaineering Equipment | Climbing Accessories | | |
| Mountaineering Equipment | Tools | | |
| Personal Accessories | Watches | 53510 | |
| Personal Accessories | Eyewear | 134134 | |
| Personal Accessories | Knives | 43330 | |
| Personal Accessories | Binoculars | 56666 | |
| Personal Accessories | Navigation | 270074 | |
| Outdoor Protection | Insect Repellents | 215432 | |
| Outdoor Protection | Sunscreen | 72348 | |
| Outdoor Protection | First Aid | 14244 | |
| Golf Equipment | Irons | 13924 | |
| Golf Equipment | Woods | 23244 | |
| Golf Equipment | Putters | | |

Products By Qty
Products By Revenue
Products By unit cost
Dictionary

FIG. 10

| Product Line | Product | pack |
|---|---|---|
| Camping Equipment | Cookin | n [+goods] paquet *m* |
| Camping Equipment | Tents | → Chicken pieces are available in five-pound packs. |
| Camping Equipment | Sleepi | → She read the back of the pack. |
| Camping Equipment | Packs | a pack of cigarettes  un paquet de cigarettes |
| Camping Equipment | Lanter | in packs of ten  en paquet de dix |
| Mountaineering Equipment | Rope | → Aspirin was sold in packs of 10 |
| Mountaineering Equipment | Safety | → Nappy liners available in packs of 10 |
| Mountaineering Equipment | Climbi | → B&Q has a range of file transfers that come in packs of six |
| Mountaineering Equipment | Tools | (=backpack) sac *m* à dos |
| Personal Accessories | Watches | → I hid the money in my pack |
| Personal Accessories | Eyewear | → I took a bottle of whiskey from my pack |
| Personal Accessories | Knives | 134134 |
| Personal Accessories | Binoculars | 43330 |
| Personal Accessories | Navigation | 56666 |
| Personal Accessories | Insect Repellents | 270074 |
| Outdoor Protection | Sunscreen | 215432 |
| Outdoor Protection | First Aid | 72348 |
| Golf Equipment | Irons | 14244 |
| Golf Equipment | Woods | 13924 |
| Golf Equipment | Putters | 23244 |

DRILL-THROUGH LENS FOR GENERATING DIFFERENT TYPES OF REPORTS

CROSS-REFERENCE TO RELATED APPLICATION

This application is a non-provisional application that is related to application Ser. No. 13/171,156, entitled "COMPARATIVE AND ANALYTIC LENS", filed on the same date herewith, which application is incorporated herein by reference in its entirety.

BACKGROUND

Embodiments of the invention relate to a drill-through lens for drilling through to data.

In Business Intelligence (BI) reports, a user often needs to drill through or navigate from a source report to a target report. This may be done by clicking on a source cell in the source report, which leads to running of the target report, filtered by the context of the source cell in the source report. The current technique of navigating from the source report to the target report renders data in a same window as the source report or a new window with the target report.

A preview window is a representation of an object behind a static hyper link.

The Internet Explorer® browser accelerators execute selections through a context menu against a Uniform Resource Locator (URL) of the users choosing. (Internet Explorer is a trademark of Microsoft Corporation in the United States and/or other countries.)

In conventional systems, a user may select data by clicking the data or by selecting drill-through from a context menu of the data. In some browser utilities, the user selects a word with a mouse and looks it up using a search engine.

SUMMARY

Provided are a method, computer program product, and system for providing drill-through information. User input of locations of one or more target documents and values of parameters for those one or more target documents is received. A user is allowed to move a drill-through lens window across a source document, wherein the drill-through lens window displays a floating, transparent target document. In response to the drill-through lens window floating over the data in the source document, in real time: the data is selected in the source document, the selected data is identified as a parameter for a target document, the parameter is used to obtain further details from the target document, and the drill-through lens window is displayed showing the further details.

BRIEF DESCRIPTION OF THE SEVERAL VIEWS OF THE DRAWINGS

Referring now to the drawings in which like reference numbers represent corresponding parts throughout:

FIG. 4 illustrates a first example of a drill-through lens window in accordance with certain embodiments.

FIG. 6 illustrates a third example of a drill-through lens window in accordance with certain embodiments.

FIG. 9 illustrates further details of switching a type of report in accordance with certain embodiments.

FIG. 10 illustrates a fifth example of a drill-through lens window in accordance with certain embodiments.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Figure 1:
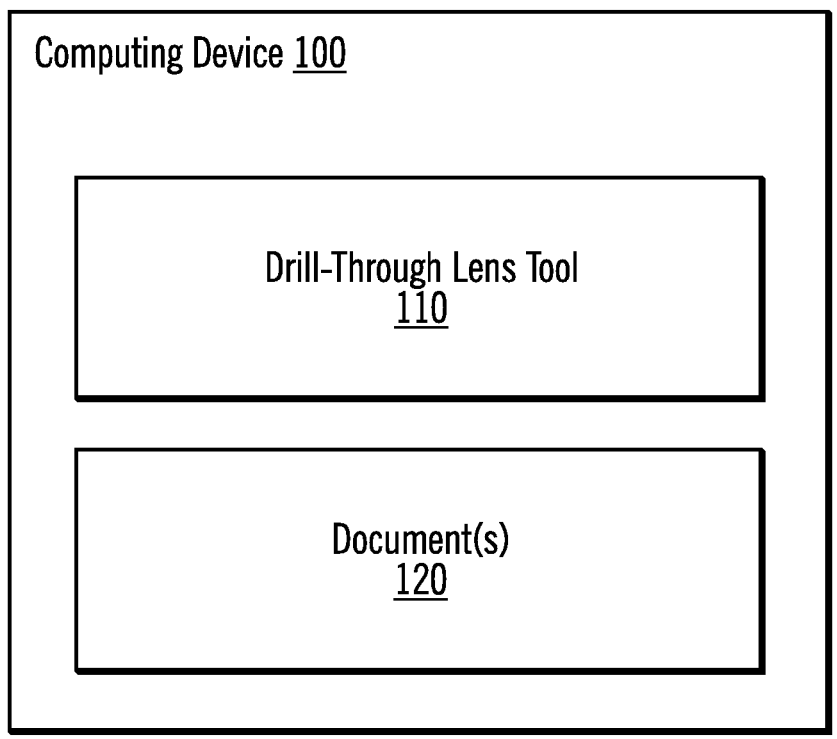
FIG. 1 illustrates, in a block diagram, a computing device with a drill-through lens tool in accordance with certain embodiments.

FIG. 1 illustrates, in a block diagram, a computing device 100 with a drill-through lens tool 110 in accordance with certain embodiments. The computing device 100 also includes documents 120 (e.g., list report views, spreadsheets, reports, cross tabulations, lists, etc).

The drill-through lens tool 110 provides a drill-through lens window. The drill-through lens window is a floating window that allows the user to hover over data to investigate further (instead of the user having to select the data prior to proceeding). The drill-through lens window 510 is a new window with the properties of a window (e.g., the drill-through lens window 510 may be moved, resized, etc.).

A drill-through lens window has a set of configurable actions that the user can select from and configure. A drill-through lens window takes the object that it is hovering over as a parameter and passes the object, along with other configurable parameters to a URL, which represents the location of another document 120

In certain embodiments, the drill-through lens tool 110 provides a lens type drill through view for running reports that are targets of drill-through when the user hovers a drill-through lens window over a cell in the source report. The drill-through lens tool 110 renders the target report transparently within the drill-through lens window in real-time. In this manner, the drill-through lens tool 110 enables a user to navigate to a target report while remaining in the context of the source report.

The drill-through lens tool 110 displays the drill-through lens window without leaving a current view of the source document and without changing a layout of the source document.

Figure 2:
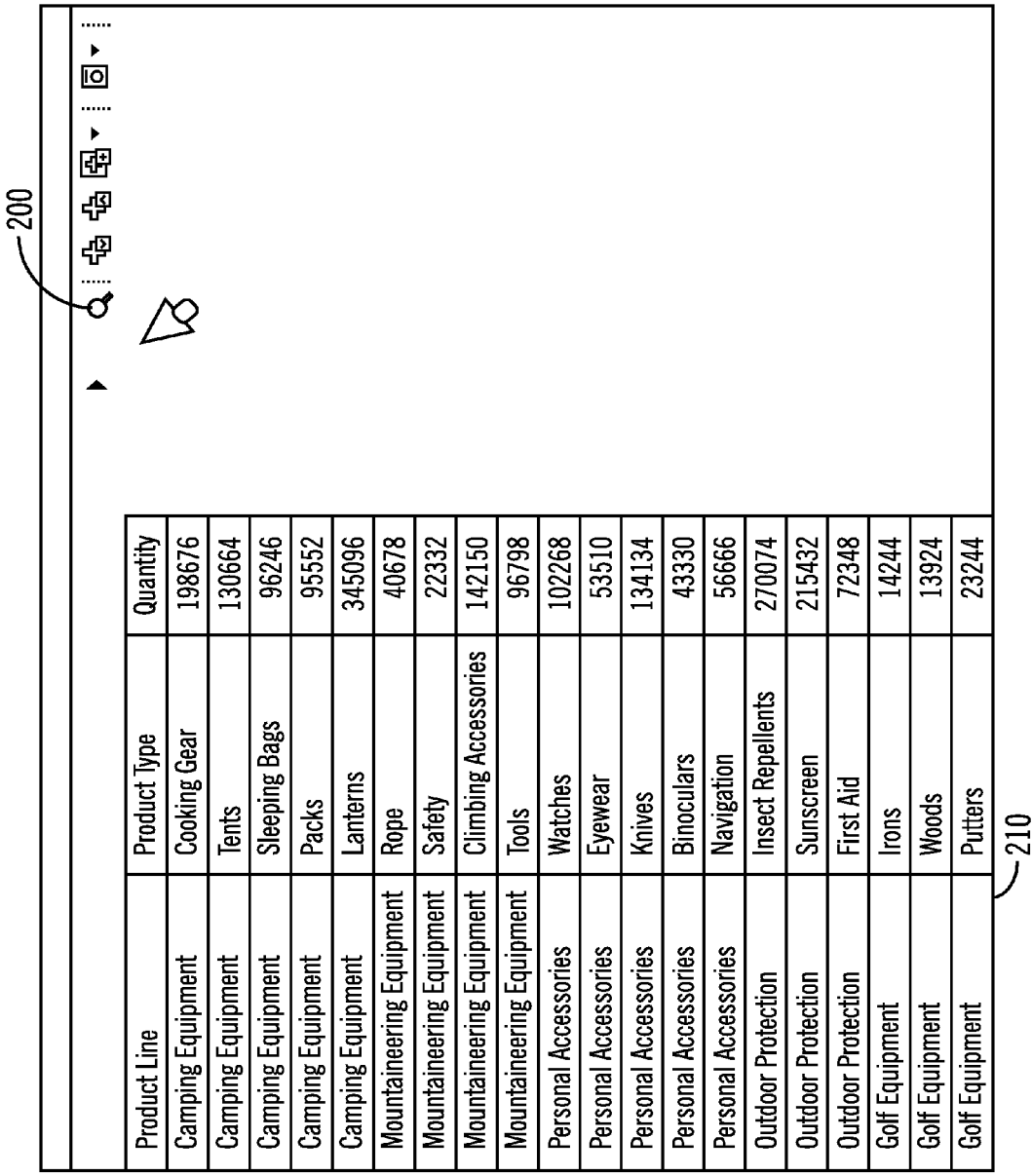
FIG. 2 illustrates a drill-through lens combo box in accordance with certain embodiments.

FIG. 2 illustrates a drill-through lens combo box 200 in accordance with certain embodiments. In FIG. 2, the drill-through lens tool 110 provides a drill-through lens combo box 200 in the list report view 210. The list report view 210 includes columns and rows of data. In certain embodiments, a user may select the drill-through lens tool 110 by right clicking on the drill-through lens combo box 200.

A combo box may be described as a graphical user interface widget that is a combination of a drop-down list or list box and a single-line textbox and which allows the user to either type a value directly into the control or choose from the list of existing options. In certain embodiments, the drill-through lens tool 110 provides multiple drill-through lens windows associated with different pre-set configuration information (i.e., pre-configured drill-through lens windows). In such embodiments, the user may select a drill-through lens window from the multiple drill-through lens windows using the drill-through combo box 200. In response to the selection, the drill-through tool 110 displays a drill-through lens window with data based on the pre-set configuration information. In addition, the user may also use the drill-through combo box 200 to indicate that a new drill-through lens window is to be configured, and the drill-through lens tool 110 displays a drill-through configuration window.

"Lens selection" may be described as a situation in which the user hovers over data with the drill-through lens window. A user may "hover over" data using the drill-through lens window by placing any portion of the drill-through lens window over the data of the document 120 (e.g., list report view). The drill-through lens window may be a rectangular window or may have an associated graphic (which may be a circle, plus sign or other graphic) for allowing more accuracy with selections while hovering.

Figure 3:
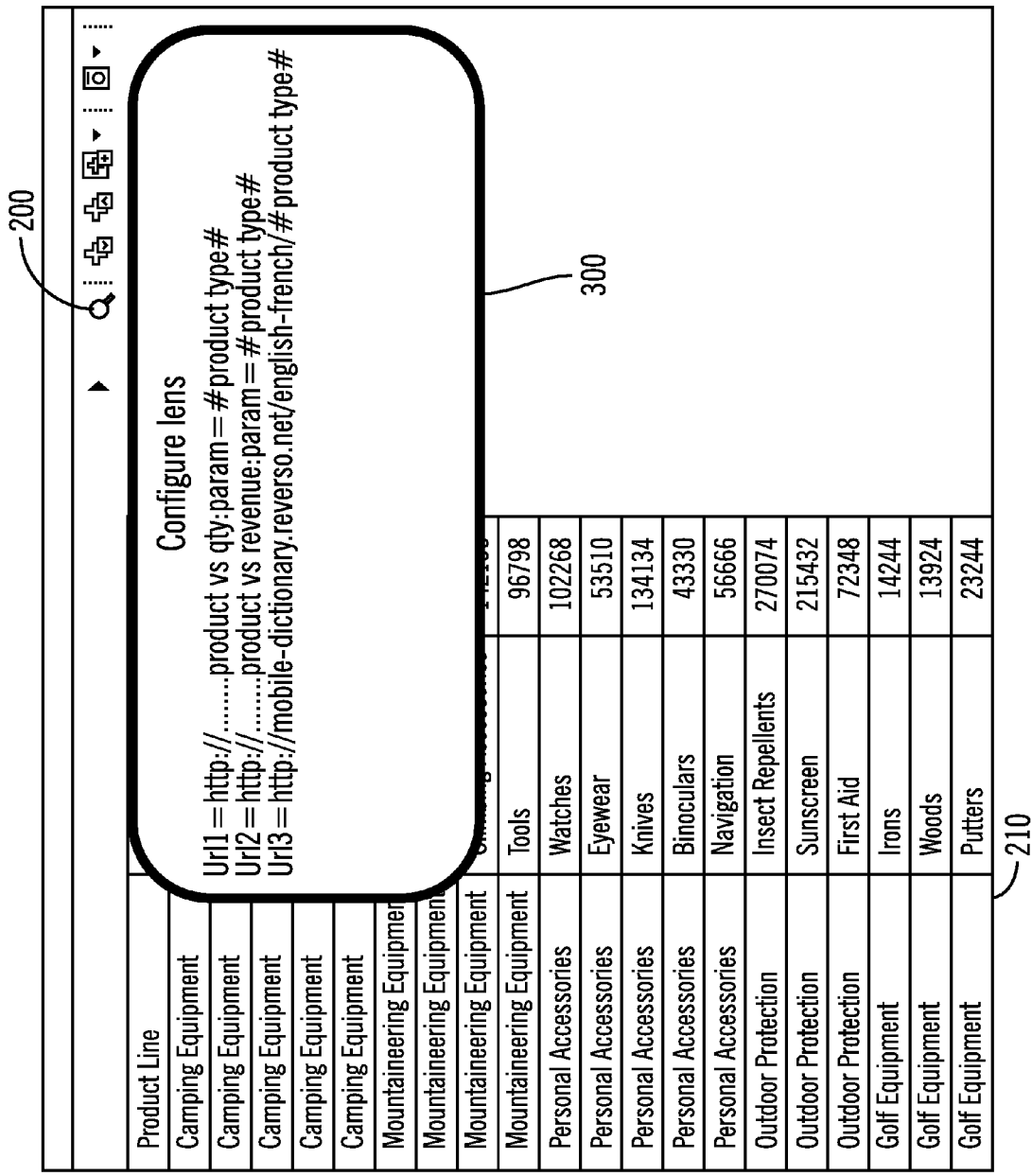
FIG. 3 illustrates configuration of the drill-through lens tool in a configuration window in accordance with certain embodiments.

FIG. 3 illustrates configuration of the drill-through lens tool 110 in a configuration window 300 in accordance with certain embodiments. For the examples shown in FIGS. 3-10, a user may select types of reports, such as product vs. quantity (qty), product vs. revenue, product vs. unit cost or dictionary. The user inputs configuration data, such as, a target document and parameters for that target document for one or more types of report. In FIG. 3, the drill-through lens tool 110 receives user input of target documents for drill-through. In FIG. 3, three pseudo URLs are provided with parameter values for three target documents, URL1 for product vs. quantity (qty), URL2 for product vs. revenue, and URL3 for dictionary. In addition, the user may use the configuration window 300 to provide configuration data to adjust the size of the drill-through lens window, transparency of the drill-through lens window, dwell time to resolve the URL, and other properties of the drill-through lens window.

After the user has provided the user input, the user may use the drill-through lens window to hover over items for which the user wants to see more detail.

FIG. 4 illustrates a first example of a drill-through lens window 410 in accordance with certain embodiments. Once the user input of target documents is received, the drill-through lens tool 110 displays the drill-through lens window 410. In this example, the drill-through lens tool 110 also provides a transparent, associated graphic 400. As the user hovers over new data in the list report view 210 with the drill-through lens window 410, the drill-through lens tool 110 displays the drill-through lens window 410 with a new report. The drill-through lens window 410 is a new window with the properties of a window (e.g., the drill-through lens window 410 may be moved, resized, etc.). The user may also hover over new data using the associated graphic 400 for more accuracy with selection.

The drill-through lens window may display any type of document. In certain embodiments, the drill-through lens window may display a floating, transparent document 120. The drill-through lens window may be said to be floating as the drill-through lens window may be overlaid over a document. The drill-through lens window, the document displayed in the drill-through lens window, and the associated graphic may be said to be transparent (i.e., seen through) to some degree of transparency (e.g., 10%) to enable the user to know the context (i.e., where the user is) of the displayed document.

Assume that the user has selected a product vs. quantity (qty) report for FIG. 4. In FIG. 4, the drill-through lens window 410 hovers over the "Product Type" column of the list report view 210, and the associated graphic 400 is positioned over "Cooking Gear" in the "Product Type" column of the list report view 210. The drill-through lens tool 110 displays drill-through data for "Cooking Gear" in the drill-through lens window 410. In particular, because the user has selected a product vs. quantity report, the drill-through lens tool 110 uses "Cooking Gear" as the parameter for #product type# in URL1 in the configuration window 300 of FIG. 3. Then, the drill-through lens tool 110 displays more detail for the parameter "Cooking Gear". Once the drill-through lens tool 110 puts the parameter in the URL and goes to that URL, the drill-through lens tool 110 gets the rendered output and displays the rendered output as a document in the drill-through lens window.

Each time the user hovers over a new item with the drill-through lens window 410 or selects a new item using the associated graphic 400, the drill-through lens tool 110 renders a new report in the drill-through lens window 410.

Figure 5:
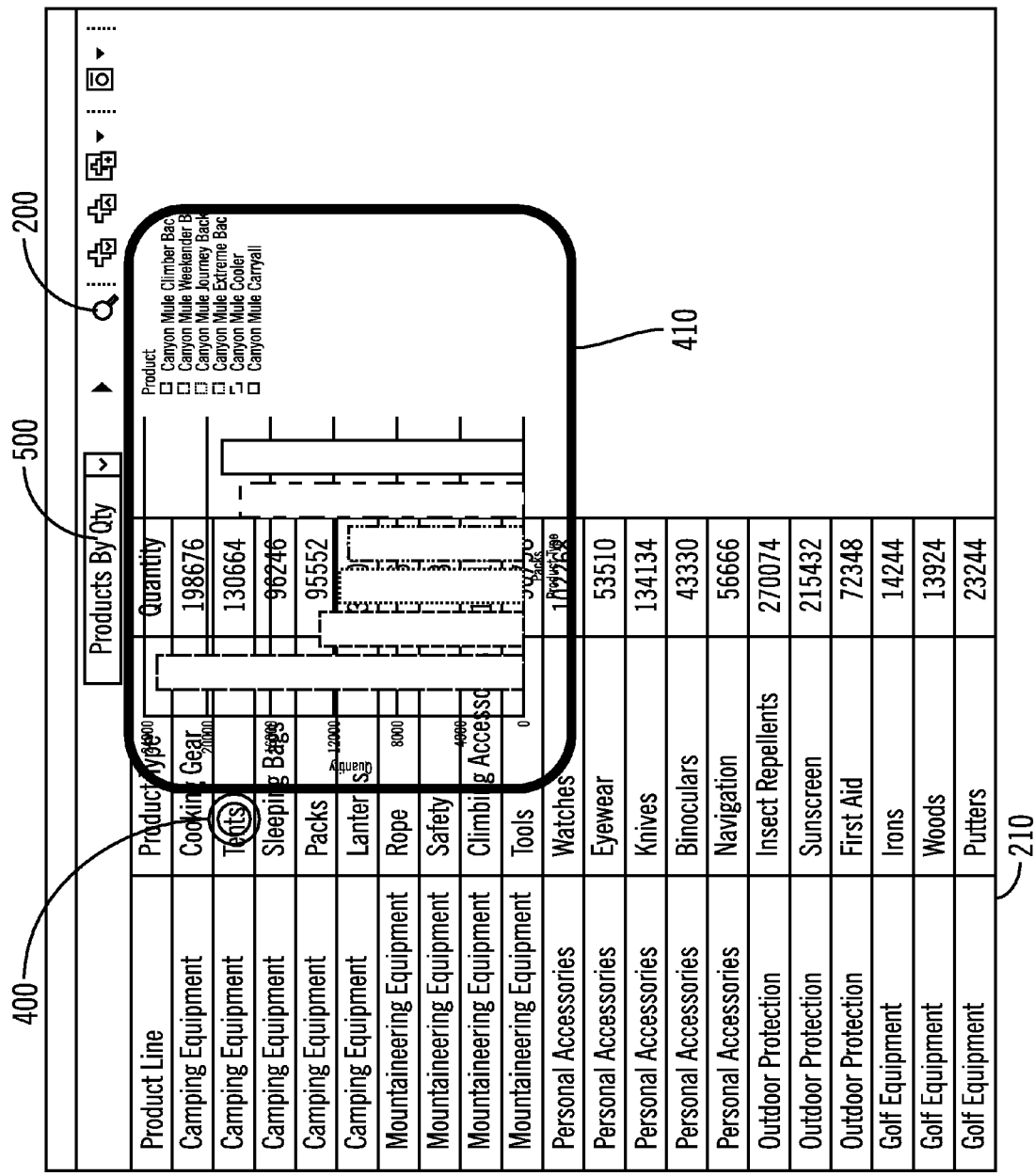
FIG. 5 illustrates a second example of a drill-through lens window in accordance with certain embodiments.

FIG. 5 illustrates a second example of a drill-through lens window 410 in accordance with certain embodiments. In FIG. 5, a report selector combo box 500 is illustrated. In certain embodiments, the report selector combo box 500 is on top of and a part of the drill-through lens window 410. A user may use the report selector combo box 500 to select a type of report, such as product vs. quantity (qty), product vs. revenue, or dictionary. In FIG. 5, the user has selected a product vs. quantity (qty) report with the report selector combo box 500. In FIG. 5, the drill-through lens window 410 hovers over the "Product Type" column of the list report view 210, and the associated graphic 400 is positioned over "Tents" in the "Product Type" column of the list report view 210. The drill-through lens tool 110 displays drill-through data for "Tents" in the drill-through lens window 410. In particular, because the user has selected a product vs. quantity report, the drill-through lens tool 110 uses "Tents" as the parameter for #product type# in URL1 in the configuration window 300 of FIG. 3. That is, the drill-through lens tool 110 uses underlying data as a parameter. Then, the drill-through lens tool 110 displays more detail for the product type "Tents", which the drill-through lens tool 110 uses as a parameter.

FIG. 6 illustrates a third example of a drill-through lens window 410 in accordance with certain embodiments. In FIG. 6, the user has selected a product vs. quantity (qty) report with the report selector combo box 500. In FIG. 6, the drill-through lens window 410 hovers over the "Product Type" column of the list report view 210, and the associated graphic 400 is positioned over "Sleeping Bags" in the "Product Type" column of the list report view 210. The drill-through lens tool 110 displays drill-through data for "Sleeping Bags" in the drill-through lens window 410. In particular, because the user has selected a product vs. quantity report, the drill-through lens tool 110 uses "Sleeping Bags" as the parameter for #product type# in URL1 in the configuration window 300 of FIG. 3. Then, the drill-through lens tool 110 displays more detail for the parameter "Sleeping Bags".

Figure 7:
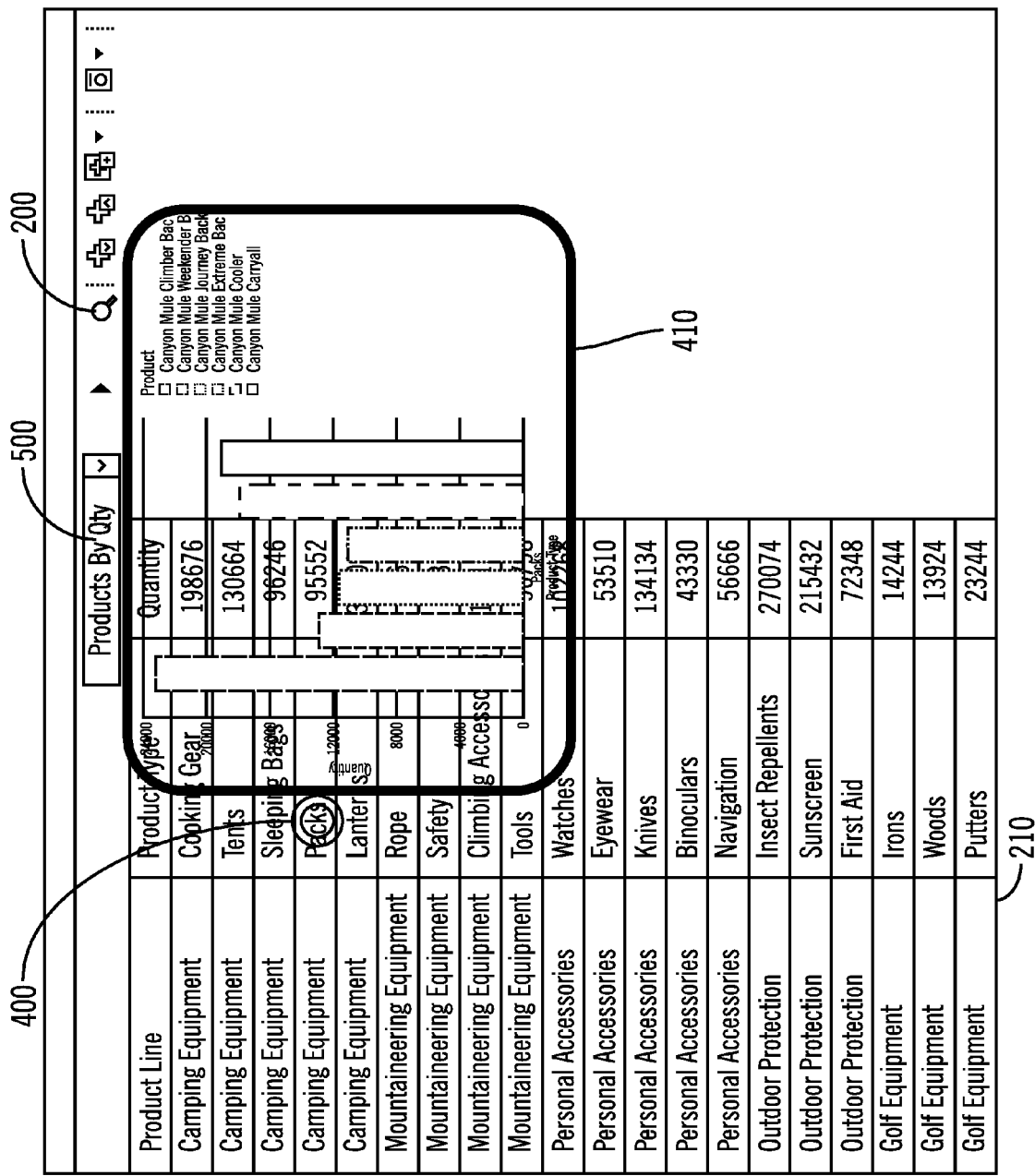
FIG. 7 illustrates a fourth example of a drill-through lens window in accordance with certain embodiments.

FIG. 7 illustrates a fourth example of a drill-through lens window 410 in accordance with certain embodiments. In FIG. 7, the user has selected a product vs. quantity (qty) report with the report selector combo box 500. In FIG. 7, the drill-through lens window 410 hovers over the "Product Type" column of the list report view 210, and the associated graphic 400 is positioned over "Packs" in the "Product Type" column of the list report view 210. The drill-through lens tool 110 displays drill-through data for "Packs" in the drill-through lens window 410. In particular, because the user has selected a product vs. quantity report, the drill-through lens tool 110 uses "Packs" as the parameter for #product type# in URL1 in the configuration window 300 of FIG. 3. Then, the drill-through lens tool 110 displays more detail for the parameter "Packs".

Figure 8:
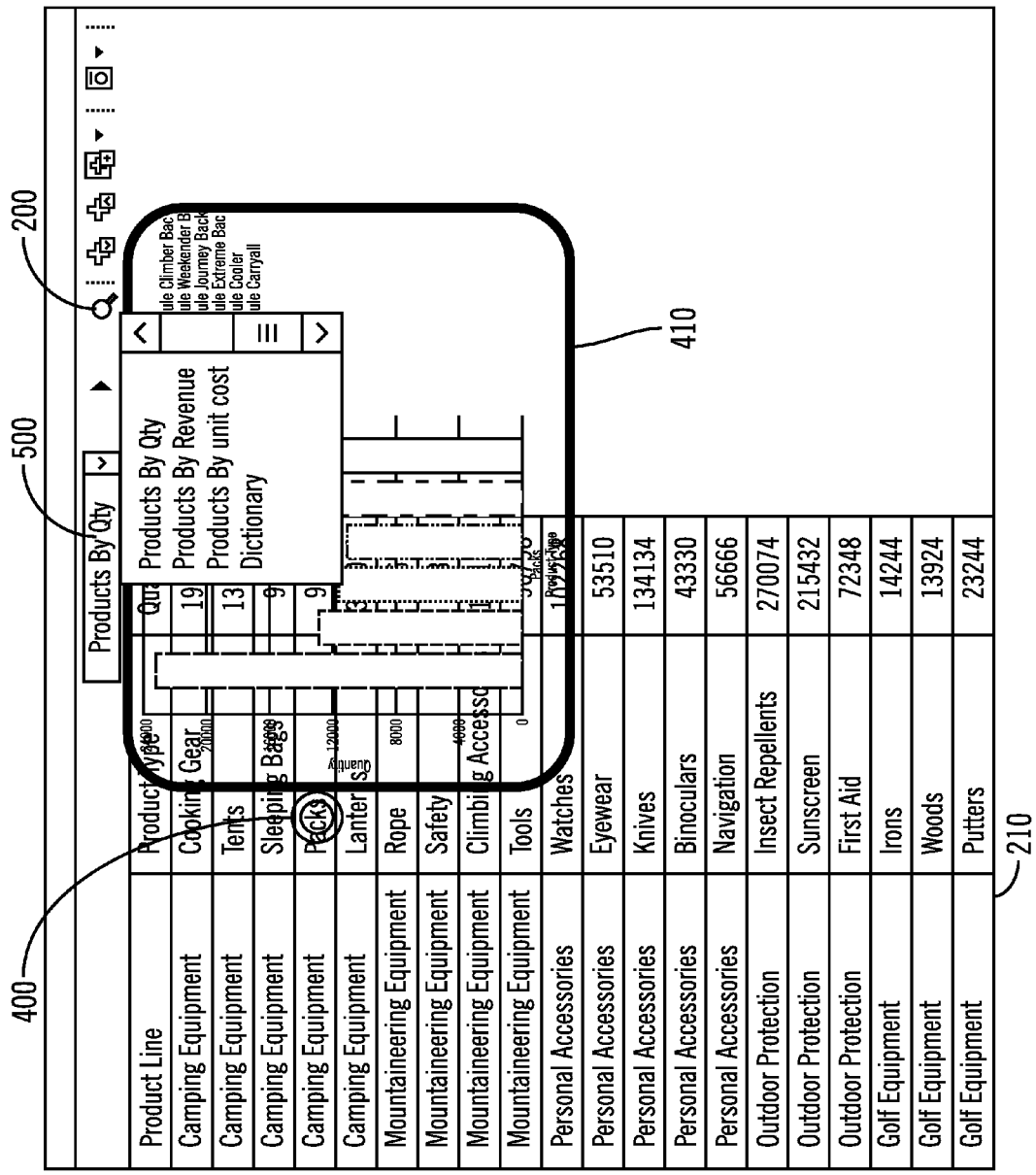
FIG. 8 illustrates switching a type of report in accordance with certain embodiments.

FIG. 8 illustrates switching a type of report in accordance with certain embodiments. In FIG. 8, the user has selected the report selector combo box 500. Four types of reports are displayed: products by qty, products by revenue, products by unit cost, and dictionary.

FIG. 9 illustrates further details of switching a type of report in accordance with certain embodiments. In FIG. 9, the user has selected the dictionary type of report using the report selector combo box 500.

FIG. 10 illustrates a fifth example of a drill-through lens window in accordance with certain embodiments. In FIG. 10, the user has selected a dictionary report with the report selector combo box 500. In FIG. 10, the drill-through lens window 410 hovers over the "Product Type" column of the list report view 210, and the associated graphic 400 is positioned over "Packs" in the "Product Type" column of the list report view 210. The drill-through lens tool 110 displays dictionary data for "Packs" in the drill-through lens window 410. In particular, because the user has selected a dictionary report, the drill-through lens tool 110 uses "Packs" as the parameter for #product type# in URL3 in the configuration window 300 of FIG. 3. Then, the drill-through lens tool 110 displays dictionary data for the parameter "Packs".

In certain embodiments, the drill-through lens tool 110 floats the drill-through lens window over a list or report and then uses the text underneath the floating window as a parameter against the active URL or drill-through target associated with the floating window to get content to render in the floating window.

Figure 11:
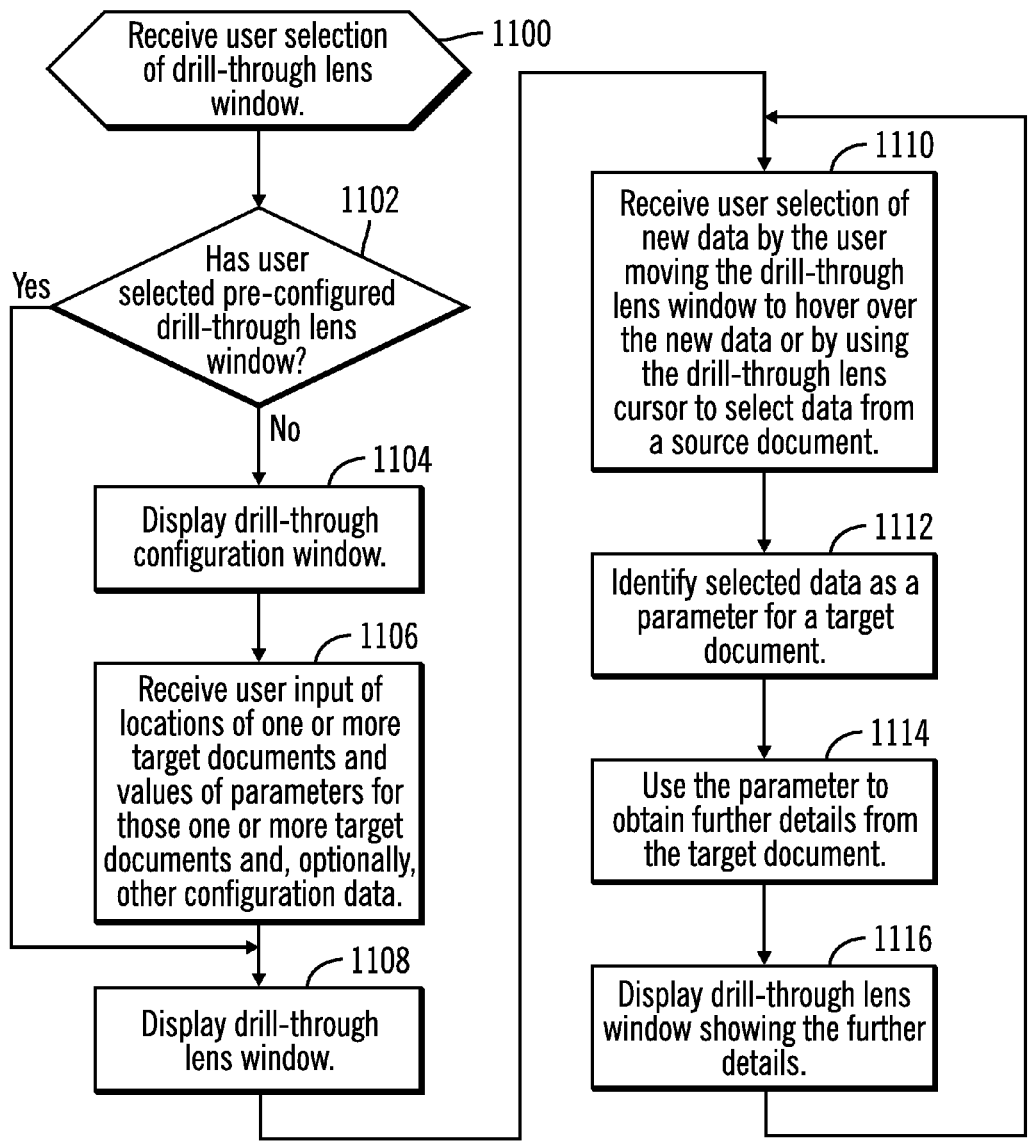
FIG. 11 illustrates, in a flow diagram, logic for drill-through of data in accordance with certain embodiments.

FIG. 11 illustrates, in a flow diagram, logic for drill-through of data in accordance with certain embodiments. Control begins in block 1100 with receipt of user selection of a drill-through lens window (either for a new drill-through lens window or for a pre-configured drill-through lens window via the combo box). In block 1102, the drill-through lens tool 110 determines whether the user has selected a pre-configured drill-through lens window. If so, processing continues to block 1108, otherwise, processing continues to block 1104.

In block 1104, the drill-through lens tool 110 displays the drill-through configuration window. In block 1106, the drill-through tool 110 receives user input of locations of one or more target documents and values of parameters for those one or more target documents and, optionally, additional configuration data. In block 1108, the drill-through lens tool 110 displays the drill-through lens window. In block 1110, the drill-through lens tool 110 receives user selection of data by the user moving the drill-through lens window to hover over the data or by using the associated graphic to select data from a source document. In block 1112, the drill-through lens tool 110 uses the selected data as a parameter for a target document. The drill-through lens tool 110 selects the target document based on the data selected in the source document. In block 1114, the drill-through lens tool 110 uses the parameter to obtain further details from the target document. In block 1116, the drill-through lens tool displays the drill-through lens window showing the further details. From block 1116, processing loops back to block 1110. Because processing loops back to block 1110, as the user moves the drill-through lens window, the drill-through lens window is updated with newly rendered data. In certain embodiments, the user may stop use of the drill-through lens window to exit this loop.

In certain embodiments, the user selects the drill-through lens tool 110. The user adjusts the target document of the drill-through and the size and other properties of the drill-through lens window. The drill-through lens tool 110 displays a drill-through lens window with an associated graphic. The user moves the drill-through lens window or associated graphic across the report, and, whenever the user dwells on a cell, or clicks that cell, the drill-through lens tool 110 renders the target report of the drill through transparently in the drill-through lens window.

The drill-through lens tool 110 allows configurable navigation using a drill-through lens to trigger the navigation. In certain embodiments, the user can configure the destination or text to display, and contextual help is supplied by a product owner. In certain embodiments, it is possible to have metadata describing the data in each cell, the type and value, so that the drill-through lens tool 110 is able to distinguish what kind of data it is hovering over and selectively select which cell values to consume based on the metadata that the drill-through lens tool 110 detects when drill-through lens tool 110 hovers over a cell. In addition, it is possible to activate certain URLs or to switch drill through lenses or configurations based on the metadata in the cells. Moreover, a user may configure the drill-through lens window to ignore cells based on metadata that the cells contain.

The drill-through lens tool 110 allows a first report user to drill through to a second target report. In particular, the drill-through lens tool 110 displays a new window, allows the user to configure in the window the second target report drill through parameters, and allows the user to move the window across the first report, whereby, when the window hovers over an item of the first report, the drilled through data for the item from the second target report is instantly displayed in the window.

ADDITIONAL EMBODIMENT DETAILS

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

The drill-through lens tool 110 may be implemented as hardware (e.g., hardware logic or circuitry), software, or a combination of hardware and software.

Figure 12:
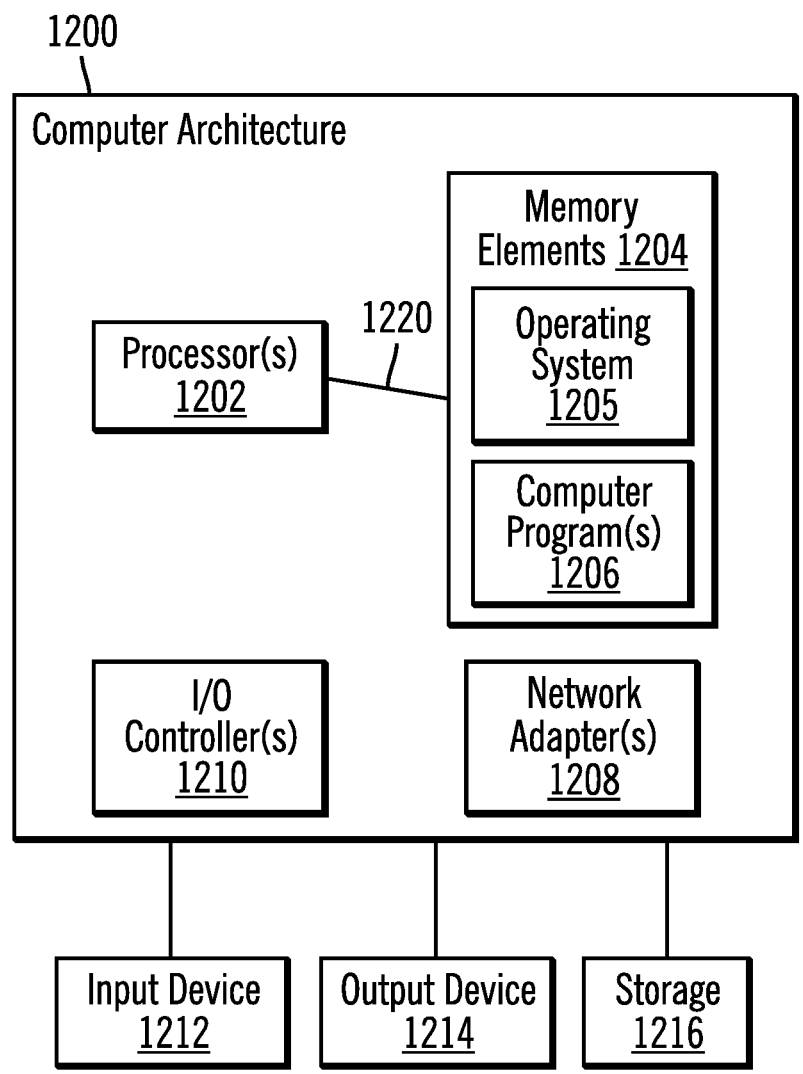
FIG. 12 illustrates, in a block diagram, a computer architecture that may be used in accordance with certain embodiments.

FIG. 12 illustrates a computer architecture 1200 that may be used in accordance with certain embodiments. Computing device 100 may implement computer architecture 1200. The computer architecture 1200 is suitable for storing and/or executing program code and includes at least one processor 1202 coupled directly or indirectly to memory elements 1204 through a system bus 1220. The memory elements 1204 may include local memory employed during actual execution of the program code, bulk storage, and cache memories which provide temporary storage of at least some program code in order to reduce the number of times code must be retrieved from bulk storage during execution. The memory elements 1204 include an operating system 1205 and one or more computer programs 1206.

Input/Output (I/O) devices 1212, 1214 (including but not limited to keyboards, displays, pointing devices, etc.) may be coupled to the system either directly or through intervening I/O controllers 1210.

Network adapters 1208 may also be coupled to the system to enable the data processing system to become coupled to other data processing systems or remote printers or storage devices through intervening private or public networks. Modems, cable modem and Ethernet cards are just a few of the currently available types of network adapters 1208.

The computer architecture 1200 may be coupled to storage 1216 (e.g., a non-volatile storage area, such as magnetic disk drives, optical disk drives, a tape drive, etc.). The storage 1216 may comprise an internal storage device or an attached or network accessible storage. Computer programs 1206 in storage 1216 may be loaded into the memory elements 1204 and executed by a processor 1202 in a manner known in the art.

The computer architecture 1200 may include fewer components than illustrated, additional components not illustrated herein, or some combination of the components illustrated and additional components. The computer architecture 1200 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method for providing drill-through information, comprising:
   defining multiple types of reports, wherein each of the multiple types of reports is represented by a Uniform Resource Locator (URL) that includes a parameter;
   in response to receiving selection of a first type of report among the multiple types of reports using a report selector that is part of a drill-through lens window and receiving an indication that the drill-through lens window is floating over first data in a source document, in real time:
      generating a first target report using the first data as a first value of the parameter in the URL representing the first type of report to obtain drill-through data for the first data and the first type of report from a first target document; and
      displaying the first target report in the drill-through lens window as transparent and as floating over the source document; and
   in response to receiving selection of a second type of report among the multiple types of reports using the report selector and receiving an indication that the drill-through lens window is floating over the first data in the source document, in real time:
      generating a second target report using the first data as a second value of the parameter in the URL representing the second type of report to obtain drill-through data for the first data and the second type of report from a second target document; and
      displaying the second target report in the drill-through lens window as transparent and as floating over the source document.

2. The method of claim 1, wherein a location of the first target document comprises a URL and further comprising:
   using the URL to generate the first target report.

3. The method of claim 1, further comprising:
   displaying the drill-through lens window without leaving a current view of the source document and without changing a layout of the source document.

4. The method of claim 1, further comprising:
   providing pre-configured drill-through lens windows.

5. The method of claim 1, further comprising:
   providing a report selector combo box as the report selector for selecting the type of report to be displayed in the drill-through lens window.

6. The method of claim 1, further comprising:
   displaying the drill-through lens window with an associated graphic, wherein the associated graphic is used to select the first data.

7. A system for providing drill-through information, comprising:
   a processor; and
   storage coupled to the processor, wherein the storage stores a computer program, and wherein the computer program is executed by the processor to perform operations, the operations comprising:
      defining multiple types of reports, wherein each of the multiple types of reports is represented by a Uniform Resource Locator (URL) that includes a parameter;
      in response to receiving selection of a first type of report among the multiple types of reports using a report selector that is part of a drill-through lens window and receiving an indication that the drill-through lens window is floating over first data in a source document, in real time:
         generating a first target report using the first data as a first value of the parameter in the URL representing the first type of report to obtain drill-through data for the first data and the first type of report from a first target document; and
         displaying the first target report in the drill-through lens window as transparent and as floating over the source document; and
      in response to receiving selection of a second type of report among the multiple types of reports using the report selector and receiving an indication that the drill-through lens window is floating over the first data in the source document, in real time:
         generating a second target report using the first data as a second value of the parameter in the URL representing the second type of report to obtain drill-through data for the first data and the second type of report from a second target document; and
         displaying the second target report in the drill-through lens window as transparent and as floating over the source document.

8. The system of claim 7, wherein a location of the first target document comprises a URL, and wherein the operations further comprise:
   using the URL to generate the first target report.

9. The system of claim 7, wherein the operations further comprise:
    displaying the drill-through lens window without leaving a current view of the source document and without changing a layout of the source document.

10. The system of claim 7, wherein the operations further comprise:
    providing pre-configured drill-through lens windows.

11. The system of claim 7, wherein the operations further comprise:
    providing a report selector combo box as the report selector for selecting the type of report to be displayed in the drill-through lens window.

12. The system of claim 7, wherein the operations further comprise:
    displaying the drill-through lens window with an associated graphic, wherein the associated graphic is used to select the first data.

13. A computer program product for providing drill-through information, the computer program product comprising:
    a non-transitory computer readable storage medium having computer readable program code embodied therewith, wherein the computer readable program code, when executed by a processor of a computer, is configured to perform:
    defining multiple types of reports, wherein each of the multiple types of reports is represented by a Uniform Resource Locator (URL) that includes a parameter;
    in response to receiving selection of a first type of report among the multiple types of reports using a report selector that is part of a drill-through lens window and receiving an indication that the drill-through lens window is floating over first data in a source document, in real time:
        generating a first target report using the first data as a first value of the parameter in the URL representing the first type of report to obtain drill-through data for the first data and the first type of report from a first target document; and
        displaying the first target report in the drill-through lens window as transparent and as floating over the source document; and
    in response to receiving selection of a second type of report among the multiple types of reports using the report selector and receiving an indication that the drill-through lens window is floating over the first data in the source document, in real time:
        generating a second target report using the first data as a second value of the parameter in the URL representing the second type of report to obtain drill-through data for the first data and the second type of report from a second target document; and
        displaying the second target report in the drill-through lens window as transparent and as floating over the source document.

14. The computer program product of claim 13, wherein a location of the first target document comprises a URL, and wherein the computer readable program code, when executed by the processor of the computer, is configured to perform:
    using the URL to generate the first target report.

15. The computer program product of claim 13, wherein the computer readable program code, when executed by the processor of the computer, is configured to perform:
    displaying the drill-through lens window without leaving a current view of the source document and without changing a layout of the source document.

16. The computer program product of claim 13, wherein the computer readable program code, when executed by the processor of the computer, is configured to perform:
    providing pre-configured drill-through lens windows.

17. The computer program product of claim 13, wherein the computer readable program code, when executed by the processor of the computer, is configured to perform:
    providing a report selector combo box as the report selector for selecting the type of report to be displayed in the drill-through lens window.

18. The computer program product of claim 13, wherein the computer readable program code, when executed by the processor of the computer, is configured to perform:
    displaying the drill-through lens window with an associated graphic, wherein the associated graphic is used to select the first data.

* * * * *